United States Patent [19]

Toyooka et al.

[11] Patent Number: 5,359,443
[45] Date of Patent: Oct. 25, 1994

[54] PROCESS FOR PRODUCING HEAT-RESISTANT OPTICAL ELEMENT BY HEATING LIQUID CRYSTAL POLYMER AT POLYMERIZATION TEMPERATURE DURING OR AFTER ORIENTATION TREATMENT

[75] Inventors: Takehiro Toyooka; Hiroyuki Itoh, both of Yokohama, Japan

[73] Assignee: Nippon Oil Company, Limited, Tokyo, Japan

[21] Appl. No.: 980,482

[22] Filed: Nov. 23, 1992

[30] Foreign Application Priority Data

Nov. 22, 1991 [JP] Japan .................. 3-354205
Nov. 22, 1991 [JP] Japan .................. 3-354206

[51] Int. Cl.$^5$ .............. G02F 1/1337; G02F 1/13; C09K 19/52; C09K 19/00
[52] U.S. Cl. ................................. 359/76; 359/103; 359/106; 252/299.01; 428/1
[58] Field of Search .............. 359/103, 106, 76; 252/299.01; 428/1

[56] References Cited

U.S. PATENT DOCUMENTS

| | | | |
|---|---|---|---|
| 5,054,888 | 10/1991 | Jacobs et al. | 359/76 |
| 5,064,697 | 11/1991 | Takiguchi et al. | 359/76 |
| 5,066,107 | 11/1991 | Yoshinaga et al. | 359/103 |
| 5,067,797 | 11/1991 | Yokokura et al. | 359/76 |
| 5,073,294 | 12/1991 | Shannon et al. | 359/106 |
| 5,098,975 | 3/1992 | Omelis et al. | 359/103 |
| 5,114,612 | 5/1992 | Benicewicz et al. | 252/299.01 |
| 5,132,147 | 7/1992 | Takiguchi et al. | 427/393.5 |
| 5,132,390 | 7/1992 | Domszy et al. | 528/176 |
| 5,147,682 | 9/1992 | Takiguchi et al. | 427/58 |
| 5,193,020 | 3/1993 | Shiozaki et al. | 359/106 |
| 5,206,752 | 4/1993 | Itoh et al. | 359/106 |
| 5,250,214 | 10/1993 | Kanemoto et al. | 359/63 |

FOREIGN PATENT DOCUMENTS 3-87720  4/1991  Japan .
4-22917  1/1992  Japan .

*Primary Examiner*—Anita P. Gross
*Attorney, Agent, or Firm*—Scully, Scott, Murphy & Presser

[57] ABSTRACT

A process for producing an optical element using a liquid crystalline polymer and superior in heat resistance is provided. In a process for producing an optical element comprising a light transmitting substrate, an alignment film formed on the substrate and a layer of a liquid crystalline polymer formed on the alignment film, or in a process for producing an optical element, involving transferring a layer of a liquid crystalline polymer formed on an orientating substrate onto a light transmitting substrate, the said liquid crystalline polymer being a heat-polymerizable polymer which exhibits a nematic orientation or a twisted nematic orientation in the state of liquid crystal and which assumes a glassy state at a temperature below the liquid crystal transition point thereof, the liquid crystalline polymer layer is heat-treated during an orientating treatment, or after fixing of the orientation obtained, or after the transfer.

9 Claims, No Drawings

PROCESS FOR PRODUCING HEAT-RESISTANT OPTICAL ELEMENT BY HEATING LIQUID CRYSTAL POLYMER AT POLYMERIZATION TEMPERATURE DURING OR AFTER ORIENTATION TREATMENT

BACKGROUND OF THE INVENTION

The present invention relates to a process for producing a heat-resistant optical element comprising a liquid crystalline polymer and useful in the fields of display, opto electronics and optics.

Liquid crystalline polymers are optically anisotropic and can take various molecular orientation structures as compared with polymers used commonly, and it is known that they can be utilized as various optical elements by fixing such structures thereof. Particularly, an optical element having a helical (twisted) structure in the interior of film can be attained by only an optical element using a liquid crystalline polymer. Thus, it is possible to produce optical elements having characteristics which cannot attained by conventional optical elements. It is also possible to form optical elements on various substrates by a method wherein a liquid crystalline polymer layer is oriented on an orientating substrate, and fixing, it is transferred onto a light transmitting substrate.

As optical elements using a liquid crystalline polymer, the present inventors have proposed a viewing angle compensator for liquid crystal display having a helical (twisted) structure in the interior of film (Japanese Patent Laid Open No. 87720/1991) and an optical rotator (Japanese Patent Application No. 126962/1990). These optical elements exhibit a high performance which has not been attained by the other conventional optical elements, and those formed on polymer films are light in weight, thin and highly flexibl and thus are epoch-making optical elements also having the characteristics peculiar to the polymer films. At high temperatures, however, although those optical elements are stable as long as an external force is not applied thereto, there occurs a flow of the liquid crystalline polymer layer once even a slight external force is exerted thereon because the liquid crystalline polymer possesses fluidity, resulting in that the orientation structure of the liquid crystalline polymer is destroyed and so it is impossible to maintain a predetermined optical performance. Consequently, restrictions have been placed on working environmental conditions and secondary processing conditions for the optical elements as well as conditions for mounting the optical elements to devices. Therefore, in the case of the conventional optical elements using liquid crystalline polymers, it is difficult to apply them to display elements to be mounted on vehicles and projection type liquid crystal displays for which is required a high heat resistance in their working environment. Further, in the manufacturing process for optical and display devices using optical elements containing liquid crystalline polymers, the maximum temperature in the process is limited.

It is the object of the present invention to solve the above-mentioned problems of the prior art.

Having made extensive studies for overcoming such problems of optical elements using liquid crystalline polymers, the present inventors found out that such problems were attributable to the necessity of using a liquid crystalline polymer in a state of high fluidity to orientate the polymer during the fabrication of an optical element using the liquid crystalline polymer and another necessity of keeping the polymer's fluidity low after the end of the orientation. More particularly, according to the finding of the present inventors, if heat treatment is performed during the orientating treatment for the liquid crystalline polymer or after fixing of the orientation obtained or after transfer, it is possible to orientate the liquid crystalline polymer, reduce the fluidity thereof while maintaining the orientation structure and impart heat resistance no the optical element.

SUMMARY OF THE INVENTION

In a first aspect of the present invention there is provided a process for producing an optical element comprising a light transmitting substrate, an alignment film formed on the substrate, and a film formed of a layer of a heat-polymerizable liquid crystalline polymer which exhibits a nematic or twisted nematic orientation in the state of liquid crystal phase and assumes a glassy state at a temperature below a liquid crystal transition point thereof, the said process being characterized in that the liquid crystalline polymer layer is heat-treated at a polymerization proceeding temperature of the liquid crystalline polymer during an orientating treatment and/or after fixing of the orientation obtained.

In a second aspect of the present invention there is provided a process of producing an optical element by transferring a layer of a heat-polymerizable liquid crystalline polymer formed on an orientating substrate onto a light transmitting substrate, the heat-polymerizable liquid crystalline polymer exhibiting a nematic or twisted nematic orientation in the state of liquid crystal phase and assuming a glassy state at a temperature below a liquid crystal transition point thereof, the said process being characterized in that the liquid crystalline polymer layer is heat-treated at a polymerization proceeding temperature of the liquid crystalline polymer at at least one of the stages of during an orientating treatment, after fixing of the orientation obtained and after the transfer.

According to the process of the present invention for producing a heat-resistant optical element using such liquid crystalline polymer, it is possible to impart heat resistance to the optical element while maintaining a high optical performance because the liquid crystalline polymer is used in a state of high fluidity and high orientability during the orientating treatment.

DETAILED DESCRIPTION OF THE INVENTION

The present invention will be described in detail hereinunder.

It is essential for the liquid crystalline polymer used for the optical element according to the present invention to have properties which will now be explained. For stable fixing of a nematic or twisted nematic orientation, it is important that, in the phase series of liquid crystal, there be no crystal phase in a lower temperature portion than the nematic or twisted nematic phase. In the event of presence of a crystal phase in such lower temperature portion, an inevitable passage through the crystal phase at the time of cooling for fixing results in destruction of the nematic orientation or twisted nematic orientation once obtained. It is therefore essential for the liquid crystalline polymer to have not only a good orientability based on an interface effect but also a glass phase in the lower temperature portion than the nematic phase or twisted nematic phase. Further, in order to prevent the flowing of the liquid crystalline polymer on heat treatment and improve its heat resistance, it is necessary for the liquid crystalline polymer to undergo heat polymerization. The "heat polymerization" as referred to herein indicates polycondensation with heat and/or crosslinking with heat.

Liquid crystalline polymers which exhibit a twisted nematic orientation are classified into two, one being a polymer which per se contains an optically active group and which exhibits a twisted nematic phase and the other being a mixture of a base polymer not containing an optically active group with another optically active compound which mixture exhibits a twisted nematic phase.

In the present invention it is possible to use any of heat-polymerizable liquid crystalline polymers which exhibit a nematic orientation or a twisted nematic orientation in the liquid crystal phase and assumes a glassy state at a temperature below their liquid crystal transition points. As examples of those which exhibit a nematic orientation there are mentioned main chain type liquid crystalline polymers such as polyesters, polyamides and polyester-imides. As examples of those which exhibit a twisted nematic orientation there are mentioned optically active, main chain type liquid crystalline polymers, e.g. such polyesters, polyamides and polyester-imides as are optically active, as well as polymers comprising main chain type liquid crystalline polymers which are not optically active, e.g. such polyesters, polyamides or polyester-imides as are not optically active, and other low or high molecular, optically active compounds. Above all, in view of the easiness of preparation, orientability and glass transition point, polyesters are particularly preferred. Most preferred polyesters are those which contain ortho-substituted aromatic units as constituents, but also employable are those which contain aromatic units having bulky substituent groups or aromatic units having fluorine or fluorine-containing substituent groups, as constituents in place of such ortho-substituted aromatic units. The "ortho-substituted aromatic units" as referred to herein means structural units wherein main chain-constituting bonds are ortho to each other. Examples are the following catechol, salicylic acid and phthalic acid units as well as substituted derivatives thereof:

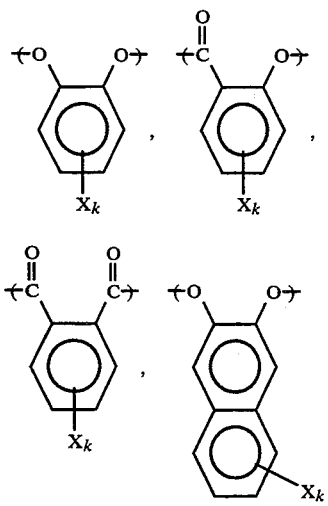

wherein X represents hydrogen, halogen, e.g. Cl or Br, an alkyl or alkoxy group having 1 to 4 carbon atoms, or phenyl, and k is 0 to 2.

The following are particularly preferred:

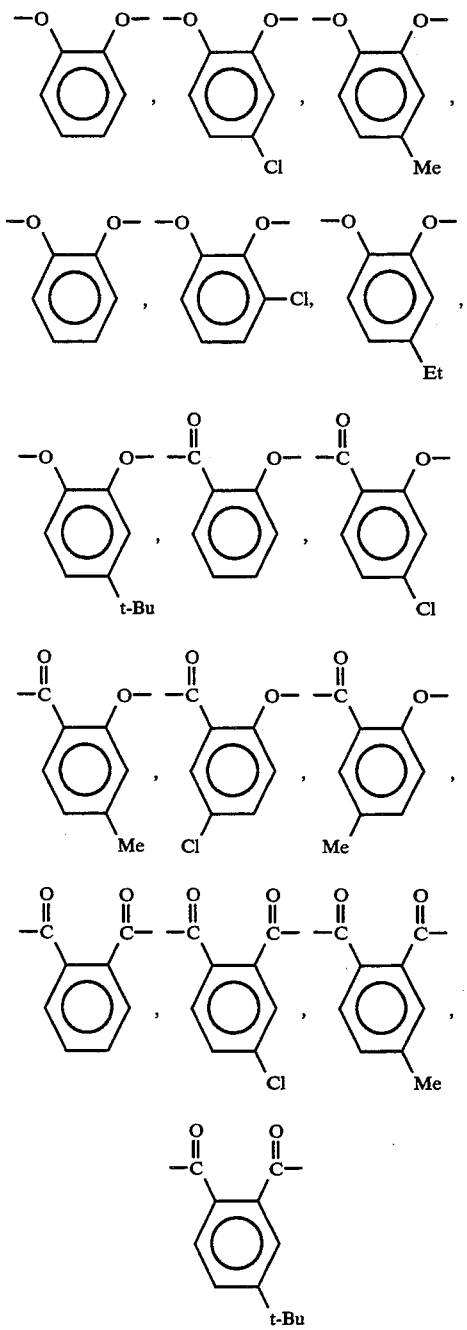

Me: methyl
Et: ethyl
Bu: butyl

Also, as examples of the polyester used preferably in the present invention there are mentioned those containing as repeating units (a) a structural unit derived from a diol (hereinafter referred to as "diol component") and a structural unit derived from a dicarboxylic acid ("dicarboxylic acid component" hereinafter) and/or a structural unit derived from a hydroxycarboxylic acid ("hydroxycarboxylic acid component hereinafter") containing both carboxyl and hydroxyl groups in one unit. Preferably, these polyesters further contain the foregoing ortho-substituted aromatic unit.

As examples of the diol component there are mentioned the following aromatic and aliphatic diols:

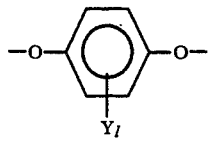

wherein Y represents hydrogen, halogen, e.g. Cl or Br, an alkyl or alkoxy group having 1 to 4 carbon atoms, or phenyl, and l is 0 to 2,

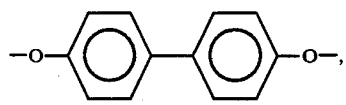

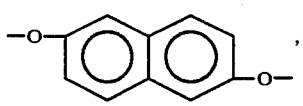

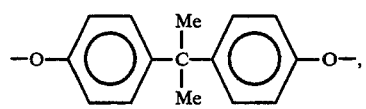

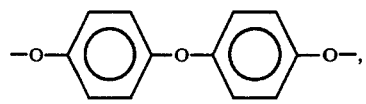

$-O\!-\!(CH_2)_n\!-\!O-$ (n is an integer of 2 to 12),

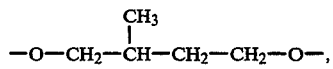

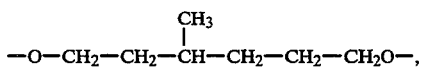

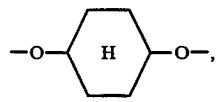

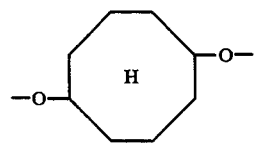

Particularly, the following are preferred:

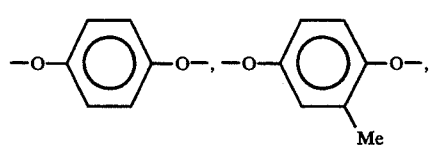

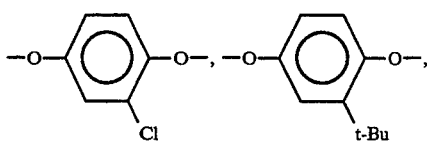

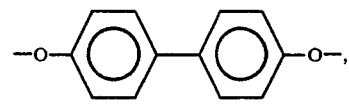

$-O-CH_2-CH_2-O-$, $-O-(CH_2)_4-O-$,

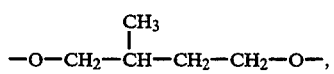

$-O(CH_2)_6O-$.

As examples of the dicarboxylic acid component, the following may be mentioned:

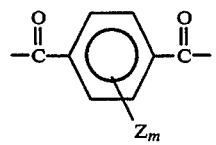

wherein Z represents hydrogen, halogen, e.g. Cl or Br, an alkyl or alkoxy group having 1 to 4 carbon atoms, or phenyl, and m is 0 to 2,

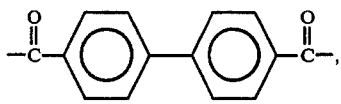

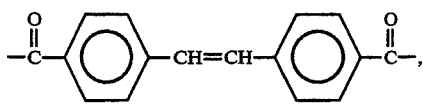

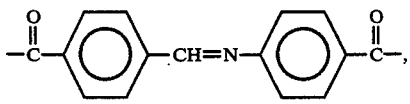

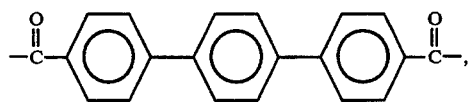

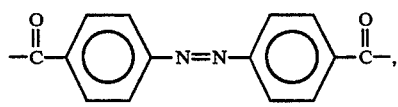

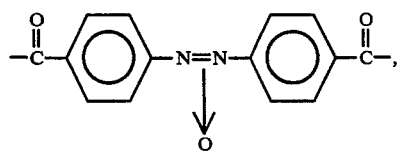

-continued

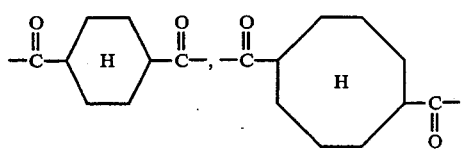

Particularly, the following are preferred:

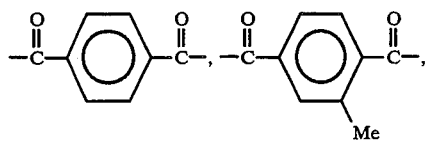

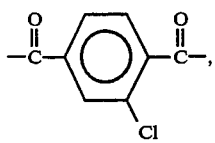

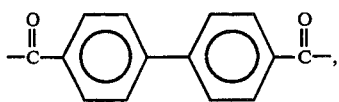

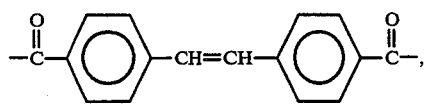

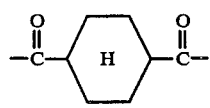

As examples of the hydroxycarboxylic acid component, the following units may be mentioned:

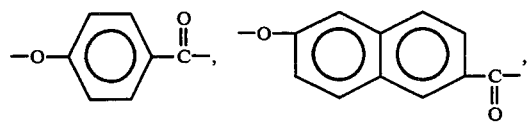

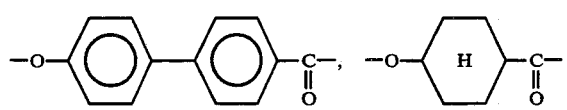

The dicarboxylic acid to diol mole ratio is approximately 1:1 like that of polyesters commonly used (carboxyl to hydroxyl ratio in the case of using a hydroxycarboxylic acid). The proportion of ortho-substituted aromatic units in the polyester is preferably in the range of 5 to 40 mole %, more preferably 10 to 30 mole %. In the case where the said proportion is smaller than 5 mole %, a crystal phase tends to appear under the liquid crystal phase, so such proportion is not desirable. A proportion larger than 40 mole % is not desirable, either, because the polymer will no longer exhibit liquid crystallinity. The following are typical examples of polyesters which may be used in the present invention:

Polymer consisting essentially of the following structural units:

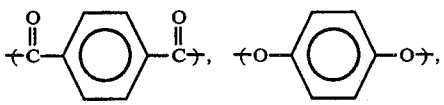

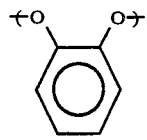

Polymer consisting essentially of the following structural units:

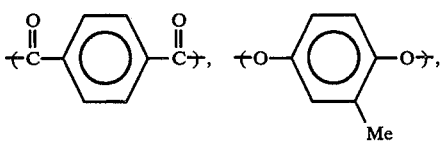

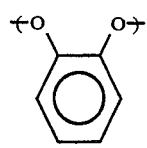

Polymer consisting essentially of the following structural units:

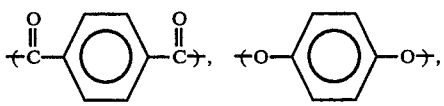

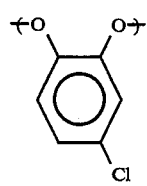

Polymer consisting essentially of the following structural units:

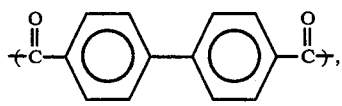

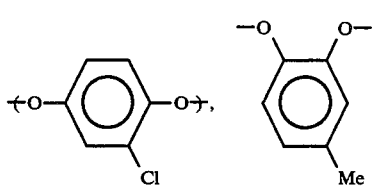

Polymer consisting essentially of the following structural units:

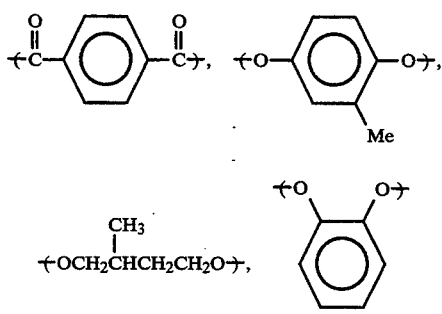

Polymer consisting essentially of the following structural units:

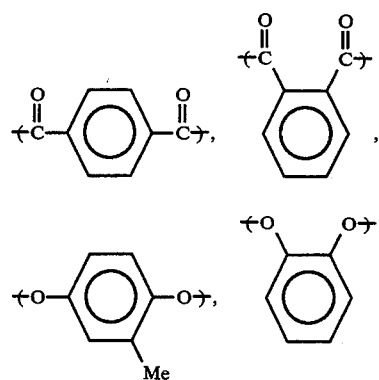

Polymer consisting essentially of the following structural units:

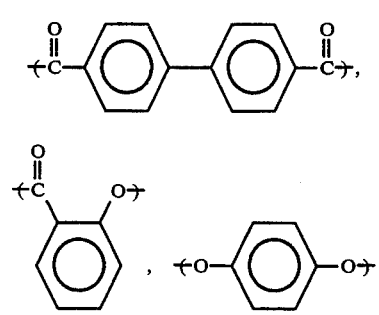

Polymer consisting essentially of the following structural units:

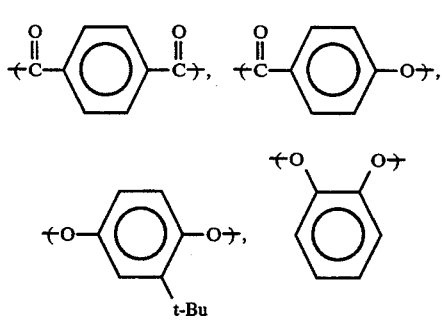

Also preferred are polymers which, in place of ortho-substituted aromatic units, contain as repeating units such bulky substituent-containing aromatic units or aromatic units containing fluorine or fluorine-containing substituents as shown below:

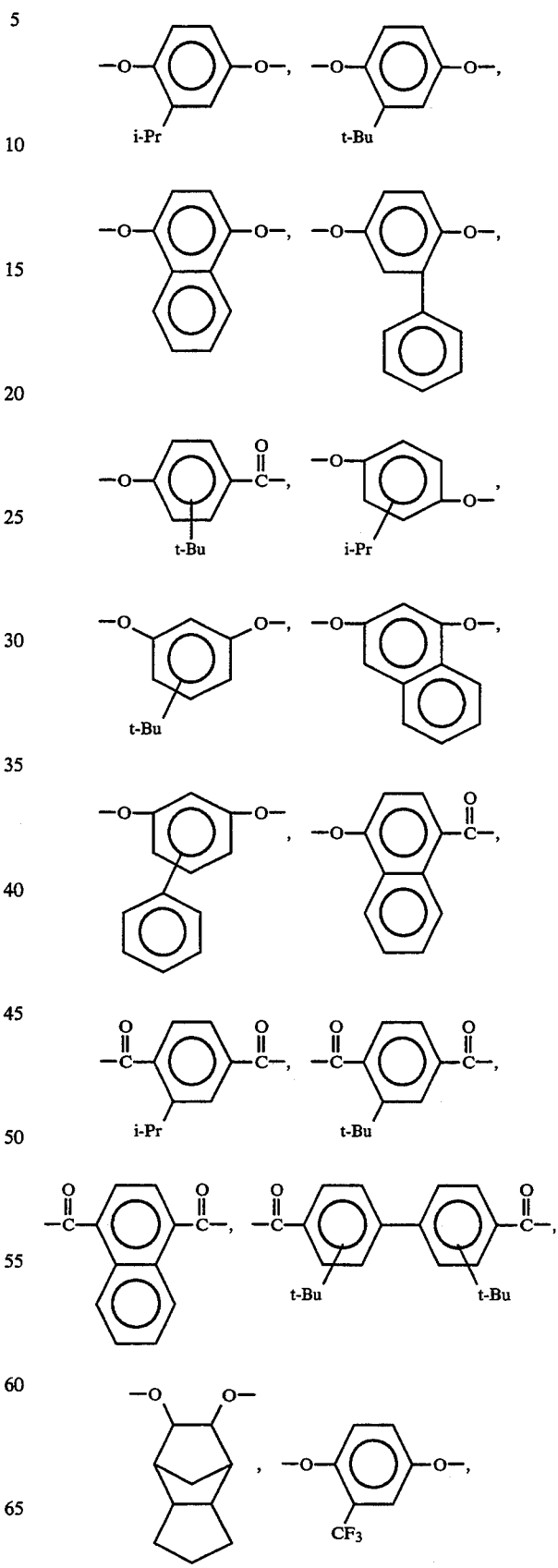

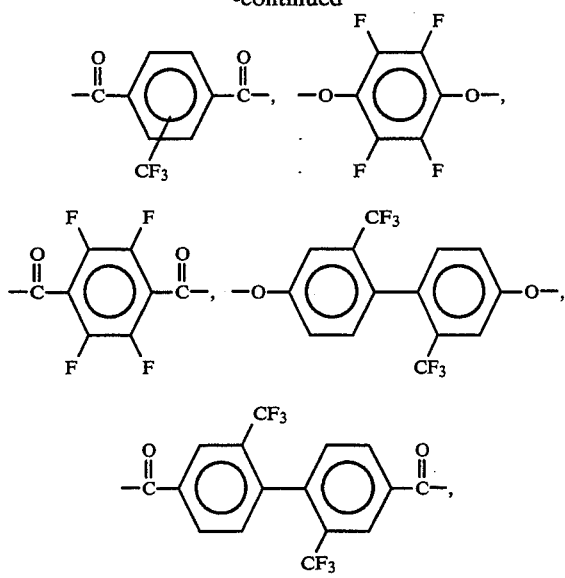

The polymers exemplified above range in molecular weight preferably from 0.05 to 3.0, more preferably 0.07 to 2.0, in terms of inherent viscosity as determined at 30° C. in a solvent, e.g. a mixed phenol/tetrachloroethane [60/40 (weight ratio)] solvent. An inherent viscosity lower than 0.05 is not desirable because the strength of the resulting film of polymer liquid crystal will be low, while if the inherent viscosity is higher than 3.0, there will arise such problems as the deterioration of orientatability and an increase of the time required for orientation because of too high viscosity during the formation of nematic or twisted nematic structure.

How to prepare the polymer used in the present invention is not specially limited. There may be adopted any of the polymerization processes known in this field, e.g. a melt polymerization process or an acid chloride process using an acid chloride of a corresponding dicarboxylic acid.

According to a melt polycondensation process, the polyester can be prepared by polymerizing a corresponding dicarboxylic acid and an acetylated compound of a corresponding diol at a high temperature and in a high vacuum. The molecular weight thereof can be adjusted easily by controlling the polymerization time or the feed composition. For accelerating the polymerization reaction there may be used a known metal salt such as sodium acetate. In the case of using a solution polymerization process, the polyester can be prepared easily by dissolving predetermined amounts of a dicarboxylic acid dichloride and a diol in a solvent and heating the resulting solution in the presence of an acid accepter such as pyridine.

An explanation will now be made about an optically active compound which is incorporated in the nematic liquid crystalline polymers exemplified above for imparting twist thereto. Typical examples are optically active low-molecular compounds. Any compound having optical activity can be used in the present invention, but from the standpoint of compatibility with the base polymer it is desirable to use optically active, liquid crystalline compounds. The following are concrete examples:

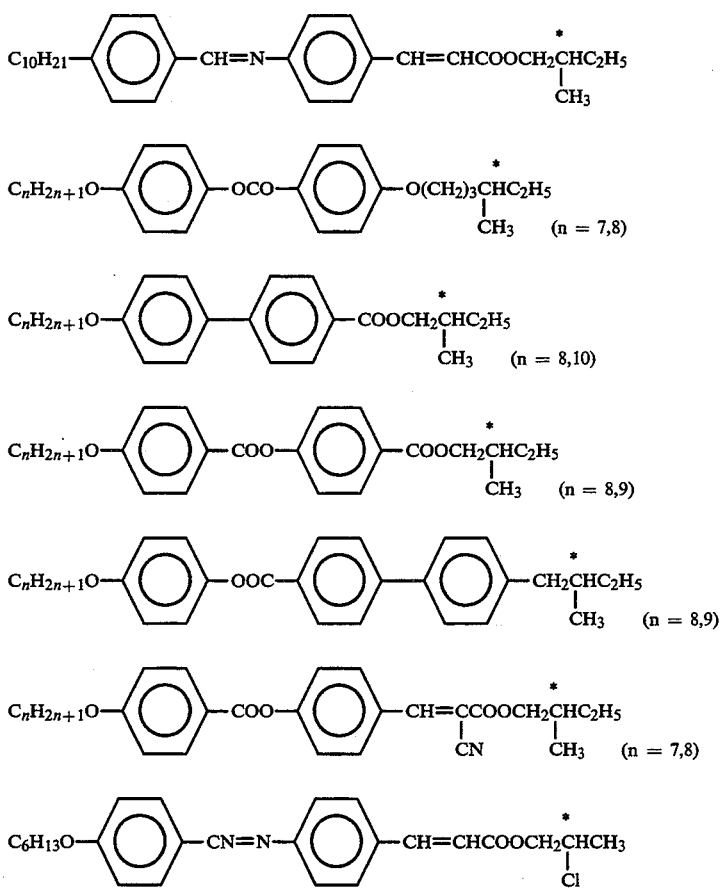

[Chemical structure: $C_{12}H_{25}$—dioxaborolane—phenyl—COO—phenyl—COOCH$_2$CHC$_6$H$_{13}$ with CH$_3$ branch, asterisk marks chiral center]

[Chemical structure: $C_nH_{2n+1}O$—biphenyl—OCH$_2$—phenyl—COOCHC$_6$H$_{13}$ with CH$_3$ branch, asterisk]

[Chemical structure: $C_8H_{17}O$—pyrimidinyl—phenyl—OCH$_2$—CH—(CH$_2$)$_3$CH$_3$ with CH$_3$ branch, asterisk]

[Chemical structure: $C_{11}H_{23}O$—pyrimidinyl—phenyl—O—CH$_2$—CH—C$_2$H$_5$ with OCH$_3$ branch, asterisk]

cholesterol derivatives.

As examples of the optically active compound used in the present invention there also may be mentioned optically active high-molecular compounds. Any high polymer may be used if only it contains an optically active group in the molecule, but when the compatibility with the base polymer is taken into account, it is desirable to use a high polymer which exhibits liquid crystallinity. Examples are the following liquid crystalline polymers having optical activity: polyacrylates, polymethacrylates, polymalonates, polysiloxanes, polyesters, polyamides, polyester amides, polycarbonates, polypeptides, and cellulose. Above all, from the standpoint of compatibility with the liquid crystalline polymer serving as the base, mainly aromatic, optically active polyesters are most preferred. Examples are the following polymers:

Polymer comprising the following structural units:

[Structures: +C(=O)—phenyl—C(=O)+, +O—phenyl(CH$_3$)—O+, +O—phenyl—O+, +OCH$_2$—*CH(CH$_3$)—CH$_2$—CH$_2$—O+]

Polymer comprising the following structural units:

[Structures: +C(=O)—phenyl—C(=O)+, +O+(CH$_2$)$_2$*CH(CH$_3$)(CH$_2$)$_3$O+]

Polymer comprising the following structural units:

[Structures: +C(=O)—biphenyl—C(=O)+]

-continued

[Structures: +O—CH$_2$—*CH(CH$_3$)—CH$_2$CH$_2$—O+, +O+(CH$_2$)$_n$O+ (n = 2–12)]

Polymer comprising the following structural units:

[Structures: +O—biphenyl—O+, +O—phenyl—O+, +C(=O)(CH$_2$)$_2$*CH(CH$_3$)(CH$_2$)$_3$C(=O)+]

Polymer comprising the following structural units:

[Structures: +C(=O)—phenyl—O+, +O—phenyl(Cl)—O+, +OCH$_2$—*CHCl—CH$_2$—CH$_2$—O+]

Polymer comprising the following structural units:

[Structures: +C(=O)—phenyl—C(=O)+, +C(=O)—phenyl—O+, +OCH$_2$—CH$_2$—O+, +O*CHCH$_2$—O+ with CH$_3$ branch]

Polymer comprising the following structural units:

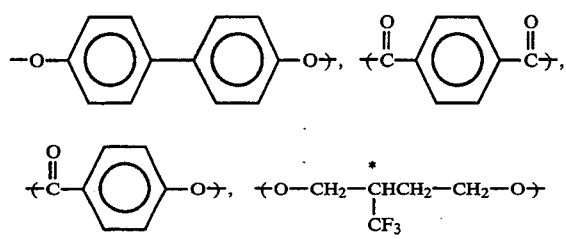

Polymer comprising the following structural units:

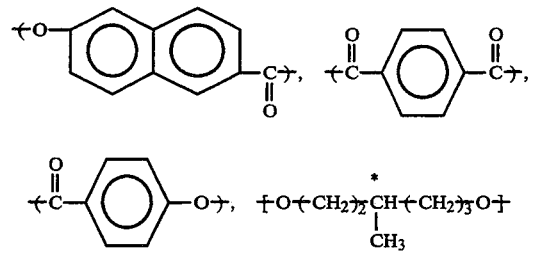

Polymer comprising the following structural units:

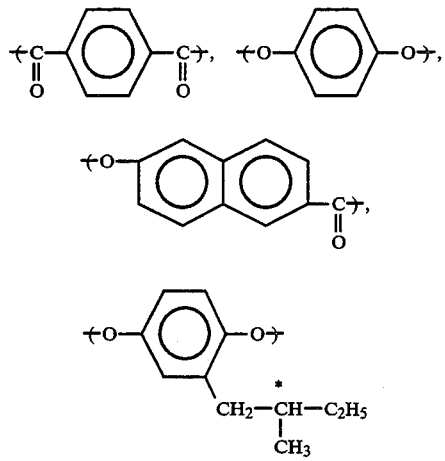

Polymer comprising the following structural units:

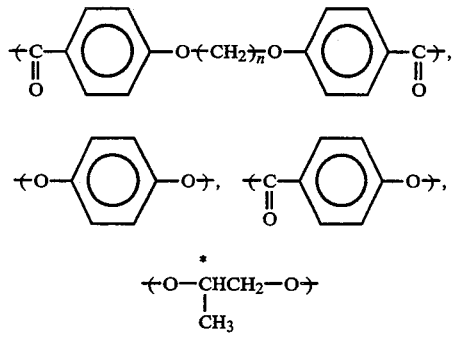

Polymer comprising the following structural units:

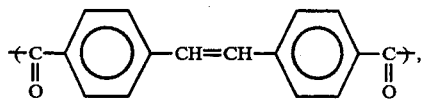

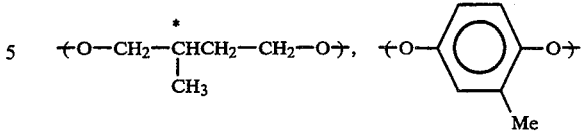

In each of these polymers, the proportion of the unit having an optically active group is usually in the range of 0.5 to 80 mole %, preferably 5 to 60 mole %.

These polymers preferably range in molecular weight from 0.05 to 5.0 in terms of inherent viscosity as determined at 30° C. in phenol/tetrachloroethane for example. An inherent viscosity larger than 5.0 is not desirable because of too high viscosity which eventually causes deterioration of orientatability. An inherent viscosity smaller than 0.05 is not desirable, either, because it becomes difficult to control the composition.

Such a predetermined ratio by a solid mixing, solution mixing or melt-mixing method. The proportion of the optically active component in the composition is in the range of preferably 0 to 50 wt %, more preferably 0 to 30 wt %, although it differs depending on the proportion of optically active groups contained in the optically active compound. If the proportion of the optically active compound is more than 50 wt %, the compatibility of the optically active compound and the polyester containing ortho-substituted aromatic units is bad in the liquid crystal state thereby exerting a bad influence on the orientation.

The polarizing optical element of the present invention can also be prepared by using a polymer liquid crystal which provides a uniform, twisted nematic orientation of monodomain for itself without using any other optically active compound and which permits the state of such orientation to be fixed easily. It is essential that the polymer in question have an optically active group in molecule thereof and be optically active. Examples are main chain type liquid crystalline polymers such as polyesters, polyamides and polyester imides. Polyesters are particularly preferred in point of easiness of preparation, superior orientatability and high glass transition point. Most preferred polyesters are those which contain ortho-substituted aromatic units as constituents. But also employable are polymers which, in place of such ortho-substituted aromatic units, contain as constituents bulky substituent-containing aromatic units or aromatic units having fluorine or fluorine-containing substituent groups. These optically active polyesters can be obtained by introducing in the liquid crystalline polyesters so far explained such optically active groups as shown below using diols, dicarboxylic acids and hydroxycarboxylic acids (the * mark in the following formulae represents an optically active carbon):

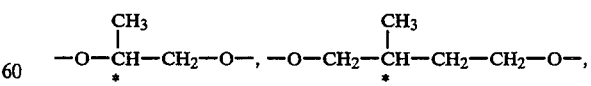

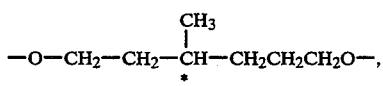

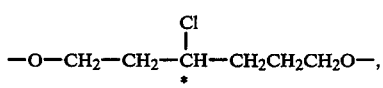

-continued

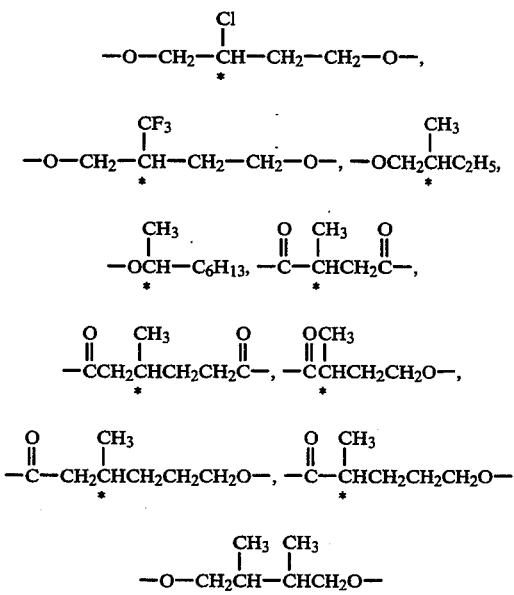

The molecular weights of these polymers are in the range of preferably 0.05 to 3.0, more preferably 0.07 to 2.0, in terms of intrinsic viscosity as determined at 30° C. in, for example, a mixed phenol/tetrachloroethane (60/20) solvent. A smaller intrinsic viscosity than 0.05 is not desirable because the strength of the resulting high molecular liquid crystal will be low, while if the intrinsic viscosity is larger than 3.0, there will arise problems such as the deterioration of orientability and an increase of the time required for orientation because of too high viscosity during the formation of liquid crystal.

These polymers can be prepared by the foregoing melt polycondensation process or acid chloride process.

The following are typical examples of the liquid crystalline polymer used in the present invention described above.

Polymers represented by:

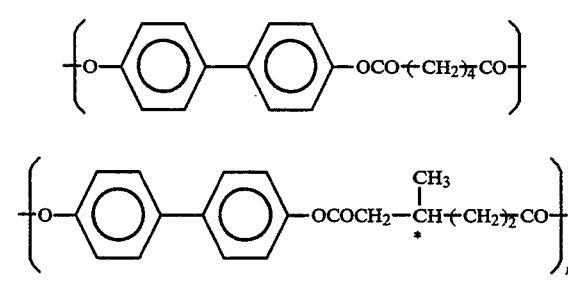

m/n = usually 99.9/0.1 to 80/20, preferably 99.5/0.5 to 90/10, more preferably 99/1 to 95/5 Polymers represented by:

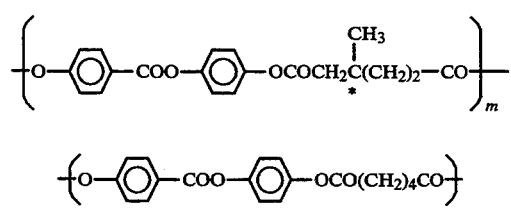

-continued

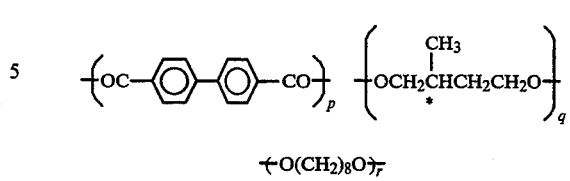

(A)/(B) = usually 99.9/0.1 to 80/20 (weight ratio), preferably 99.5/0.5 to 85/5, more preferably 99/1 to 95/5
k = l + m
l/m = 75/25 to 25/75
p = q + r
p/q = 80/20 to 20/80
Polymer mixtures represented by:

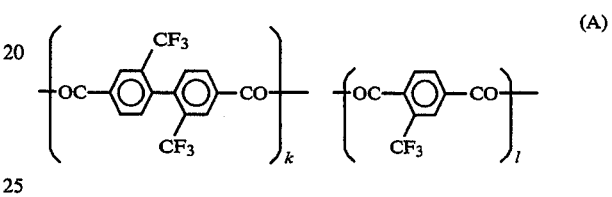

(B) cholesteryl benzoate
(A)(B) = usually 99.9/0.1 to 70/30 (weight ratio), preferably 99.5/0.5 to 80/20, more preferably 99/1 to 90/10
m = k + l
k/l = 80/20 to 20/80
Polymer mixtures represented by:

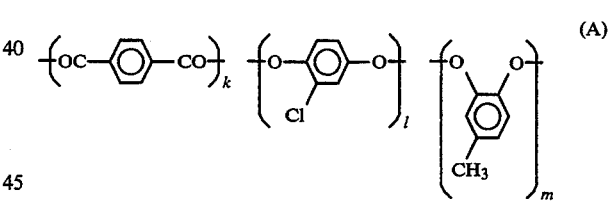

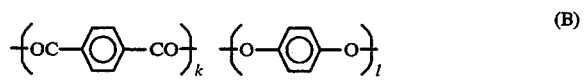

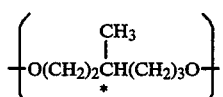

(A)(B) = usually 99.5/0.1 to 70/30 (weight ratio), preferably 99.5/0.5 to 80/20, more preferably 99/1 to 90/10
k = l + m
l/m = 25/75 to 75/25
p = q + r
p/r = 20/80 to 80/20

The mark * represents an optically active carbon.

The first heat-resistant optical element producing process according to the present invention is carried out in such a manner that, in an optical element basically constituted by a laminate structure comprising a light transmitting substrate, an alignment film formed on the light transmitting substrate and a liquid crystalline polymer film formed on the alignment film, the liquid crystalline polymer layer is heat-treated at a heat-polymerization proceeding temperature of the liquid crystalline polymer during orientating treatment and/or after fixing of the orientation obtained.

As the light transmitting base there may be used, for example, glass sheet, light transmitting plastic film or plastic sheet. As to the plastic substrate, it is preferably optically isotropic. For example, there may be used polymethyl methacrylate, polystyrene, polycarbonate, polyether sulfone, polyphenylene sulfide, polyolefin, or epoxy resin. As the alignment film, a polyimide film which has been subjected to a rubbing treatment is suitable, but, of course, there also may be used alignment films which are known in this field such as, for example, an obliquely vapor-deposited film of silicon oxide and a rubbing-treated film of polyvinyl alcohol. Further employable is one obtained by rubbing the light transmitting substrate directly. On the alignment film formed on the light transmitting substrate there is formed a layer of a nematic liquid crystalline polymer or a layer of a twisted nematic liquid crystalline polymer.

First, a nematic liquid crystalline polymer or a twisted nematic liquid crystalline polymer is dissolved in a solvent at a predetermined ratio to prepare a solution. The solvent to be used differs depending on the kind of polymers used, but usually there may be used any of ketones such as acetone, methyl ethyl ketone and cyclohexanone, ethers such as tetrahydrofuran and dioxane, halogenated hydrocarbons such as chloroform, dichloroethane, tetrachloroethane, trichloroethylene, tetrachloroethylene and o-dichlorobenzene, mixed solvents thereof with phenol, as well as dimethylformamide, dimethylacetamide, dimethyl sulfoxide and N-methylpyrrolidone. The concentration of the solution greatly differs depending on the viscosity of the polymer used, but usually it is in the range of 5% to 50%, preferably 10% to 50%. The solution is then applied onto a light transmitting substrate such as a light transmitting glass sheet or plastic sheet or film which has been subjected to an orientating treatment. How to perform the orientating treatment is not specially limited if only the molecules of the liquid crystalline polymer are oriented in parallel with the interface. A preferred example is a glass sheet or film with rubbing-treated polyimide obtained by applying a polyimide onto a substrate followed by rubbing treatment.

As the polymer solution coating method there may be adopted spin coating method, roll coating method, slot coating method, slide coating method, printing method, or dipping/pulling-up method. After the coating, the solvent is removed by drying and then heat treatment is performed at a predetermined temperature for a predetermined time to complete a nematic or twisted nematic orientation of monodomain. In the case where the heat treatment for the orientation and that for the heat polymerization are performed at a time, a higher heat treatment temperature is preferred, particularly in comparison with the heat treatment merely for orientation, in order to assist the orientation based on an interface effect and accelerate the heat polymerization. In the case where the temperature is too high, since some polymers have an anisotropic phase in a high temperature portion, there will not be obtained orientation even if heat treatment is performed in this temperature region. Thus, it is desirable to select a heat treatment temperature in accordance with the characteristics of the polymer used so that the temperature is above the glass transition point of the polymer and below the transition point to an isotropic phase and it permits the polymerization of the liquid crystalline polymer to proceed. Generally, the heat treatment temperature is in the range of preferably 100° to 350°, more preferably 150° to 300° C. The time required for attaining a satisfactory orientation in the state of liquid crystal on the alignment film and the time required for imparting a sufficient heat resistance to the resulting optical element differ depending on the composition and molecular weight of the polymer used and a desired heat resistance and so cannot be determined sweepingly, but are preferably in the range of 30 seconds to 120 minutes, more preferably 60 seconds to 100 minutes. A time shorter than 30 seconds would result in deficiency in both orientation and heat resistance, and a time longer than 120 minutes is not desirable because the productivity will be deteriorated. For attaining a satisfactory heat resistance in a short heat treatment time, the heat treatment may be conducted under reduced pressure, or a polymerization catalyst may be incorporated in the liquid crystalline polymer. The same effect can be obtained also by applying the polymer in a molten condition onto a substrate which has been subjected to an orientating treatment and thereafter applying a heat treatment thereto.

The oriented state thus obtained can be fixed as it is by subsequent cooling to a temperature below the glass transition point of the liquid crystalline polymer. Generally, in the case of using a polymer which has a crystal phase in a lower temperature portion than the liquid crystal phase, the orientation in the state of liquid crystal is destroyed by cooling. According to the optical element producing process in question, since there is used a polymer having glass phase under the liquid crystal phase, the orientation in the state of liquid crystal can be fixed completely without occurrence of such phenomenon. The cooling speed is not specially limited. A mere transfer from the heated atmosphere into an atmosphere held below the glass transition point of the polymer permits the orientation to be fixed. Forced cooling such as air cooling or water cooling may be performed for enhancing the production efficiency.

In the process of the present invention, moreover, the heat treatment for imparting heat resistance to the resulting optical element may be conducted separately from the heat treatment for orientating the liquid crystalline polymer. Further, these heat treatments may be performed in a plural number of times. More particularly, the same effect as above can also be attained even by providing a plurality of heat treatment vessels and first orientating the liquid crystalline polymer and thereafter imparting heat resistance to the sample in a high temperature vessel, or by once cooling the sample after orientation of the liquid crystalline polymer to fix the orientation in the state of liquid crystal and thereafter performing the heat treatment for imparting heat resistance to the sample. In this case, during the orientating treatment, a high heat treatment temperature is preferred for assisting the orientation based on an interface effect. But a too high temperature should be avoided. Since some polymers have an isotropic phase in the high temperature portion, it is desirable that the heat treatment be carried out at a temperature above the glass transition point of the polymer used and below the transition point to the isotropic phase and in accordance with the characteristics of the polymer. Generally, the heat treatment temperature in question is in the range of preferably 50° to 300°, more preferably 100° to 250° C. The time required for obtaining sufficient orientation in the state of liquid crystal on the alignment film differs depending on the composition and molecular weight of the polymer used and cannot be determined sweepingly, but it is preferably in the range of 10 seconds to 60 minutes, more preferably 30 seconds to 30 minutes. If the time in question is shorter than 10 seconds, the orientation obtained will be unsatisfactory, and a longer time than 60 minutes will result in deterioration of the productivity. The same state of orientation can be obtained also by applying the polymer in a molten condition onto a substrate which has been subjected to an orientating treatment, followed by heat treatment.

The thus-oriented sample is then heat-treated at a heat polymerization proceeding temperature of the liquid crystalline polymer, whereby heat resistance can be imparted to the sample without impairing the oriented state thereof. The heat treatment for imparting heat resistance to the sample may be conducted subsequently to the heat treatment for orientation or after fixing of the orientation by once cooling the sample which has been subjected to the heat treatment for orientation to a temperature below the glass transition point of the polymer. In general, this heat treatment is conducted at a temperature in the range of preferably 100° to 350° C. more preferably 150° to 300° C. and it is desirable that this heat treatment temperature be higher than the temperature of the heat treatment for only orientation, but a too high temperature is not desirable. Since some polymers have an isotropic phase in a high temperature portion, the treatment in this temperature region is not preferable because it will be impossible to maintain the oriented state obtained. Consequently, it is desirable that the heat treatment in question be performed at a polymerization proceeding temperature of the liquid crystalline polymer used and below the transition point to the isotropic phase and in accordance with the characteristics of the polymer.

The time required for the impartment of heat resistance differs depending on the composition and molecular weight of the polymer used and a desired heat resistance, so cannot be determined sweepingly. But it is preferably in the range of 10 seconds to 60 minutes, more preferably 30 seconds to 30 minutes. If it is shorter than 10 seconds, a satisfactory heat resistance will not be attained, and a time longer than 60 minutes will result in deteriorated heat resistance. In order to attain a satisfactory heat resistance in a short heat treatment time, the heat treatment may be carried out under reduced pressure, or a polymerization catalyst may be incorporated in the liquid crystalline polymer.

The thus-oriented sample is then cooled to a temperature below the glass transition point of the polymer, whereby the orientation can be fixed without impairment at all. Generally, in the case of using a polymer having a crystal phase in a lower temperature portion than the liquid crystal phase, the orientation in the state of liquid crystal is destroyed by cooling. According to the process of the present invention, the orientation in the state of liquid crystal can be fixed completely without occurrence of such phenomenon because the polymer used has a glass phase under the liquid crystal phase. The cooling speed is not specially limited. A mere transfer from the heated atmosphere into an atmosphere held at a temperature below the glass transition point of the polymer permits fixing of the oriented state.

For enhancing the production efficiency there may be adopted a forced cooling such as air cooling or water cooling.

According to the second heat-resistant optical element producing process of the present invention, in an optical element producing method basically involving transfer of a liquid crystalline polymer layer formed on an orientating substrate onto a light transmitting substrate, the liquid crystalline polymer layer is heat-treated at a polymerization proceeding temperature of the polymer at at least one of the stages of during an orientating treatment, after fixing of the orientation obtained and after the transfer.

As the orientating substrate used in this optical element producing process there may be used any substrate if only it has the ability to orientate the liquid crystalline polymer used, has predetermined heat resistance and resistance to solvents and further possesses releasability which permits separation of the liquid crystalline polymer. The orientability as well as required heat resistance, resistance to solvents and releasability differ depending on the kind and properties of the liquid crystalline polymer used, so the orientating substrate to be used cannot be determined sweepingly, but as typical examples there are mentioned sheet- or plate-like substrates such as metallic plates, e.g. aluminum, iron and copper plates, ceramic plates, enameled plates and glass sheet, with rubbing-treated polyimide film, polyvinyl alcohol film or obliquely vapor-deposited film of silicon oxide formed on the substrate. Other examples include substrates obtained by directly rubbing the surfaces of films or sheets of such plastics as polyimide, polyamide-imide, polyether-imide, polyamide, polyether ether ketone, polyether ketone, polyketone sulfide, polyether sulfone, polysulfone, polyphenylene sulfide, polyphenylene oxide, polyethylene terephthalate, polybutylene terephthalate, polyacetal, polycarbonate, acrylic resin, polyvinyl alcohol, cellulosic plastics, epoxy resin, and phenolic resin. Rubbing-treated polyimide or polyvinyl alcohol films formed on such films or sheets are also examples of the orientating film (substrate). Among these plastic films or sheets, some of those which are highly crystalline are endowed with the liquid crystalline polymer orientating ability merely by being stretched uniaxially. Such films or sheets can serve as orientating films as they are even without subjecting them to a rubbing treatment or applying thereto an alignment film of polyimide after rubbing treatment. Examples are polyimide, polyether-imide, polyether ether ketone, polyether ketone, polyphenylene sulfide, and polyethylene terephthalate.

When viewed from the working efficiency in the transfer step, highly flexible alignment films are preferred, so particularly preferred alignment films are those obtained by directly rubbing films or sheets of such plastics as polyimide, polyethylene terephthalate, polyphenylene sulfide, polyether ether ketone, polyether ketone, polyether-imide and polyvinyl alcohol.

Onto the alignment film described above is applied the liquid crystalline polymer, followed by drying and heat treatment to form a uniform nematic or twisted nematic structure of monodomain, then heat-treatment is applied to the liquid crystalline polymer layer to impart a sufficient heat resistance to the same layer, followed by cooling to fix the orientation in the state of liquid crystal without impairment thereof, and subsequent transfer of the liquid crystalline polymer layer onto a light transmitting substrate affords the optical element according to the second aspect of the present invention.

Other conditions than those for the transfer and related conditions, such as coating, drying and heat treatment, are the same as in the production of the optical element according to the first aspect of the invention described above.

Also in the second optical element manufacturing process, the heat treatment for the impartment of heat resistance may be performed separately from the heat treatment for orientating the liquid crystalline polymer, and these heat treatments may be conducted in a plural number of times. The same effect as above can be attained also by performing the heat resistance imparting heat treatment after the transfer of the liquid crystalline polymer layer onto the light transmitting substrate, even without conducting the same heat treatment on the orientating substrate.

In this way there is obtained a film having a layer of the optical element of the invention on the orientating substrate. Now, the method for transfer onto another light transmitting substrate will be described. First, the surface of the liquid crystalline polymer layer of the film and another light transmitting substrate are stuck together using an adhesive or a pressure-sensitive adhesive. Next, the liquid crystalline polymer layer is peeled off at the interface of the orientating substrate and the liquid crystalline polymer layer and it is alone transferred onto the other light transmitting substrate.

As examples of such light transmitting substrate there are mentioned plastic films having transparency and optical isotropy, in addition to various glass sheets. Examples of such plastics include polymethyl methacrylate, polystyrene, polycarbonate, polyether sulfone, polyphenylene sulfide, polyarylate, polyethylene terephthalate, amorphous polyolefin, triacetyl cellulose and epoxy resin. Particularly, polymethyl methacrylate, polycarbonate, polyether sulfone, polyarylate, triacetyl cellulose, amorphous polyolefin and polarizing film are preferred. It is also possible to tranfer the liquid crystalline polymer layer to a substrate portion of an apparatus or device which has such substrate as part thereof.

The adhesive or pressure-sensitive adhesive for sticking together the light transmitting substrate and the liquid crystalline polymer layer is not specially limited if only it is of an optical grade. For example, those prepared using acrylic resin, epoxy resin, ethylene-vinyl acetate copolymer, or rubber, are employable. The separation of the polymer layer from the orientating substrate may be done manually, but the use of a mechanical means permits the transfer to be effected more completely. Since releasability differs depending on the properties of the liquid crystalline polymer and orientating substrate used, there should be adopted a method most suitable for the system used.

As mentioned previously, the heat treatment for the impartment of heat treatment may be done after the transfer of the liquid crystalline polymer layer onto the light transmitting substrate. In this case, a high heat treatment temperature is preferred for accelerating the heat polymerization of the liquid crystalline polymer layer, but a too high temperature should be avoided because some polymers have an isotropic phase in a high temperature portion and hence the heat treatment in this temperature region will make it impossible to maintain the oriented stae. It is therefore desirable that the heat treatment be performed at a polymerization proceeding temperature of the liquid crystalline polymer and below the transition point to the isotropic phase in accordance with the characteristics of the polymer used. Generally, the heat treatment temperature is in the range of preferably 100° to 350° C., more preferably 150° to 300° C. The time required for the impartment of a satisfactory heat resistance differs depending on the composition and molecular weight of the polymer used and a desired heat resistance, so cannot be determined sweepingly, but it is preferably in the range of 10 seconds to 60 minutes, more preferably 30 seconds to 30 minutes. If it is shorter than 10 seconds, there will not be attained a satisfactory heat resistance, and if it is longer than 60 minutes, the productivity will be deteriorated. In order to attain a satisfactory heat resistance in a short heat treatment time, the heat treatment may be conducted under reduced pressure, or a polymerization catalyst may be incorporated in the liquid crystalline polymer.

The oriented film thus obtained is then cooled to a temperature below the glass transition point of the liquid crystalline polymer, whereby the orientation can be fixed without impairment at all. Generally, in the case of using a polymer having crystal phase in a lower temperature portion than the liquid crystal phase, the orientation in the state of liquid crystal is destroyed by cooling. According to the process of the present invention, since there is used a polymer having glass phase under the liquid crystal phase, the orientation in the state of liquid crystal can be fixed completely without occurrence of such phenomenon. The cooling speed is not specially limited. By a mere tranfer from the heated atmosphere into an atmosphere held at a temperature below the glass transition point of the polymer, the orientation is fixed. For increasing the production efficiency, there may be conducted a forced cooling such as air cooling or water cooling.

The first and second optical elements thus produced according to the present invention possess a high heat resistance while maintaining the characteristics of the optical elements using the liquid crystalline polymer. Therefore, the degree of freedom expands in point of working environment, secondary processing and mounting to devices, and thus the optical elements according to the present invention are extremely useful in the field of optics or epto-electronics. Particularly, in the field of display they contribute to the improvement of contrast and brightness of liquid crystal display units to be mounted on vehicles and projection type liquid crystal display units. By the use of the optical elements according to the present invention, moreover, the limitation on the maximum temperature in the manufacturing process is mitigated at the time of mounting to optical or display devices. Thus, the optical elements according to the invention are of an extremely high industrial value.

EXAMPLES

The following examples are given to further illustrate the present invention, but it i to be understood that he invention is not limited thereto. The following analyzing methods were used in those examples.

(1) Determination of Polymer Composition

Polymer is dissolved in deuterated chloroform or deuterated trifluoroacetic acid and the polymer composition is determined using 1H-NMR of 200 MHz (JNM-GX400, a product of Japan Electron Optics Laboratory Co., Ltd.).

(2) Determination of Inherent Viscosity

Determined in a mixed phenol/tetrachloroethane solvent (60/40 weight ratio) at 30° C. using a Ubbelohde's viscometer.

(3) Determination of Liquid Crystal Phase Series

Determined by measurement using DSC (DuPont 990 Thermal Analyzer) and observation using an optical microscope (BH2 Polarizing Microscope, a product of Olympus Optical Co., Ltd.).

(4) Determination of Twist Angle and Δn.d

Determined by analyzing data obtained according to a polarization analysis method with respect to twist angle and data obtained using an ellipsometer with respect to Δn.d.

Example 1

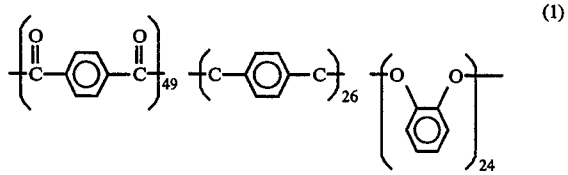

There was prepared an 18 wt % solution of the polymer (inherent viscosity: 0.13) of formula (1) in phenol/tetrachloroethane (60/40 weight ratio). This solution was cast, using a screen printer, onto a glass plate having a size of 15 cm×23 cm and a thickness of 0.1 cm and having a rubbing-treated polyimide layer, then dried, heat-treated at 280° C. for 60 minutes and thereafter cooled to fix a uniform nematic structure of monodomain. The optical element thus obtained had a Δn.d of 0.92 μm, and the inherent viscosity of the polymer was increased to 2.2. Then, a silicone-based hard coating material was applied onto the liquid crystalline polymer surface of the optical element, followed by setting and heat treatment at 120° C. for 60 minutes to harden the hard coating material. Even after the heat treatment for hardening the hard coating material, the optical element had a uniform nematic structure of monodomain, and there was recognized no change in optical parameter.

Example 2

There was prepared an 18 wt % solution of the polymer (inherent viscosity: 0.13) of formula (1) in phenol/tetrachloroethane (60/40 weight ratio). This solution was cast, using a screen printer, onto a glass plate having a size of 15 cm×23 cm and a thickness of 0.1 cm and having a rubbing-treated polyimide layer, then dried, heat-treated at 180° C. for 30 minutes and thereafter cooled to fix a uniform nematic structure of monodomain. Then, a Further heat treatment was performed at 290° C. for 45 minutes. The optical element thus obtained had a Δn.d of 0.93 μm, and the inherent viscosity of the polymer was increased to 2.8. Using a polyvinyl butyral sheet as an intermediate layer and also using another glass plate, the optical element was subjected to a pressure-bonding under heating at 140° C. and 14 kgf/cm² for 20 minutes. The resultant glass laminate had a high transparency and there was recognized no change in optical parameter.

Example 3

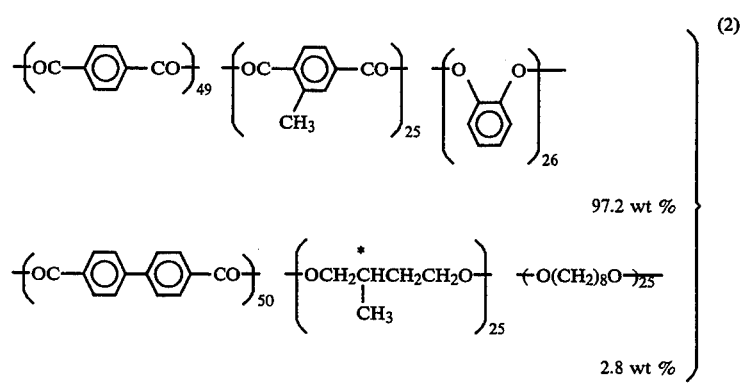

There was prepared a 15 wt % solution of the polymer mixture (inherent viscosity of a base polymer: 0.18, that of an optically active polymer: 0.15) in phenol/tetrachloroethane (60/40 weight ratio). This solution was applied, using a roll coater, onto a 50 μm thick polyether sulfone film having a size of 15 cm×23 cm and having a rubbing-treated polyimide layer, to form a coating, followed by drying, heat treatment at 180° C. for 30 minutes and subsequent cooling to fix a uniform twisted nematic structure of monodomain. Thereafter, a further heat treatment was performed at 190° C. for 60 minutes under a reduced pressure (0.05 mmHg). The optical element thus obtained has a twist angle of −230° and a Δn.d of 0.82 μm, and the polymer inherent viscosity was increased to 1.6. Then, a silicone-based hard coating material was applied onto the liquid crystalline polymer surface of the optical element by a spray coating method, and after setting, the hard coating material was hardened by heat treatment at 120° C. for 60 minutes. Even after this heat treatment, the sample still had a uniform twisted nematic structure of monodomain and there was recognized no change in optical parameter.

Comparative Example 1

There was prepared an 18 wt % solution of the polymer (inherent viscosity: 0.13) of the formula (1) in phenol/tetrachloroethane (60/40 weight ratio). This solution was cast, using a screen printer, onto a 0.1 cm thick glass plate having a size of 15 cm×23 cm and having a rubbing-treated polyimide layer, then dried, heat-treated at 180° C. for 30 minutes and then cooled to fix a nematic structure. The optical element thus obtained had a Δn.d of 0.92 μm and the polymer inherent viscosity was little changed. Then, a silicone-based hard coating material was applied onto the liquid crystalline polymer surface of the optical element by a spray coating method, and after setting, the hard coating material was hardened by heat treatment at 120° C. for 60 minutes. After this heat treatment, the orientation of the liquid crystalline polymer layer was disturbed and a monodomain structure was not maintained.

Comparative Example 2

There was prepared an 18 wt % solution of the polymer (inherent viscosity: 0.13) of the formula (1) in phenol/tetrachloroethane (60/40 weight ratio). This solution was cast, using a screen printer, onto a 0.1 cm thick glass plate having a size of 15 cm×23 cm and having a rubbing-treated polyimide layer, then dried, heat-treated at 180° C. for 30 minutes and thereafter cooled to fix a uniform nematic structure of monodomain. The optical element thus obtained had a Δn.d of 0.94 μm and the polymer inherent viscosity was little changed. Using a polyvinyl butyral sheet as an intermediate layer and also using another glass plate, the optical element was subjected to pressure-bonding at 140° C. and 14 kgf/cm² for 20 minutes. The resultant glass laminate was opaque and the uniform nematic structure of monodomain was destroyed completely.

Comparative Example 3

There was prepared a 15 wt % solution of the polymer (inherent viscosity of a base polymer: 0.18, that of an optically active polymer: 0.15) of the formula (2) in phenol/tetrachloroethane (60/40 weight ratio). This solution was applied onto a 50 μm thick polyether sulfone film having a size of 15 cm×23 cm and having a rubbing-treated polyimide layer, using a roll coater, to form a coating, then dried, heat-treated at 180° C. for 30 minutes and thereafter cooled to fix a uniform twisted nematic structure of monodomain. The optical element thus obtained had a twist angle of −225° and a Δn.d of 0.8 μm. The polymer inherent viscosity was little changed. Then, a silicone-based hard coating material was applied onto the liquid crystalline polymer surface of the optical element by a spray coating method, and after setting, the hard coating material was hardened by heat treatment at 120° C. for 60 minutes. After this heat treatment, the sample no longer had the uniform twisted nematic structure of monodomain.

Example 4

There was prepared a 17 wt % solution of the polymer (inherent viscosity: 0.18) of the formula (1) in phenol/tetrachloroethane (60/40 weight ratio). This solution was applied, using a gravure roll coater, onto a 100 μm thick polyether ether ketone (PEEK) film having a size of 15 cm×23 cm and which had been subjected to a rubbing treatment directly, to form a coating, followed by drying, heat treatment at 270° C. for 60 minutes and subsequent cooling to fix a uniform nematic structure of monodomain. Then, using a UV curing type acrylic adhesive, a 50 μm thick polyether sulfone (PES) film of the same size was bonded onto the liquid crystalline polymer layer formed on the PEEK film. Thereafter, the PEEK film which had been used as an orientating substrate was peeled off slowly, allowing the liquid crystalline polymer layer to be transferred onto the PES film. The optical element thus obtained had a Δn.d of 0.82 μm and the polymer inherent viscosity was increased to 1.9. Then, a silicone-based hard coating material was hardened by heat treatment at 120° C. for 60 minutes. Even after this heat treatment, the optical element had a uniform nematic structure of monodomain and there was recognized no change in optical parameter.

Example 5

There was prepared a 17 wt % solution of the polymer (inherent viscosity: 0.18) of the formula (1) in phenol/tetrachloroethane (60/40 weight ratio). This solution was applied, using a gravure roll coater, onto a 75 μm thick polyimide (PI) film having a size of 15 cm×23 cm and which had been subjected to a rubbing treatment directly, to form a coating, followed by drying, heat treatment at 180° C. for 30 minutes and subsequent cooling to fix a uniform nematic structure of monodomain. Thereafter, a further heat treatment was performed at 290° C. for 45 minutes. The liquid crystalline polymer layer of the optical element thus obtained was bonded onto a glass plate using an epoxy adhesive and then the PI film which had been used as an orientating substrate was peeled off slowly, allowing the liquid crystalline polymer layer to be transferred onto the glass plate. This optical element had a Δn.d of 0.80 μm and the polymer inherent viscosity was increased to 2.9. Then, using a polyvinyl butyral sheen as an intermediate layer and also using another glass plate, the optical element was pressure-bonded under heating at 140° C. and 14 kgf/cm² for 20 minutes. The resultant glass laminate had a high transparency and there was recognized no change in optical parameter.

Example 6

There was prepared a 15 wt % solution of the polymer mixture (inherent viscosity of a base polymer: 0.18, that of an optically active polymer: 0.15) of the formula (2) in phenol/tetrachloroethane (60/40 weight ratio). This solution was applied, using a roll coater, onto a 50 μm thick PEEK film having a size of 15 cm×23 cm and which had been subjected to a rubbing treatment directly, to form a coating, followed by drying, heat treatment at 180° C. for 30 minutes and subsequent cooling to fix a uniform twisted nematic structure of monodomain. The liquid crystalline polymer layer of the optical element thus obtained was bonded onto a polyarylate (PA) film using an epoxy adhesive and then the PEEK film which had been used an orientating substrate was peeled off slowly, allowing the liquid crystalline polymer layer to be transferred onto the PA film. Thereafter, the thus-transferred film was again heat-treated at 190° C. for 60 minutes under a reduced pressure (0.05 mmHg). This optical element had a twist angle of −230° and a Δn.d of 0.84 μm. The polymer inherent viscosity was increased to 1.6. Then, a silicone-based hard coating material was applied onto the liquid crystalline polymer surface of the optical element by a spray coating method, and after setting, the hard coating material was hardened by heat treatment at 120° C. for 60 minutes. Even after this heat treatment, the sample retained the uniform twisted nematic structure of monodomain and there was recognized no change in optical parameter.

Comparative Example 4

There was prepared a 17 wt % solution of the polymer (inherent viscosity: 0.18) of the formula (1) in phenol/tetrachloroethane (60/40 weight ratio). This solution was applied, using a gravure roll coater, onto a 100 μm thick polyether ether ketone (PEEK) film having a size of 15 cm×23 cm and which had been subjected to a rubbing treatment directly, to form a coating, followed by drying, heat treatment at 180° C. for 60 minutes and subsequent cooling to fix a uniform nematic structure of monodomain. Then, a 50 μm thick polyether sulfone (PES) film having the same size as that of the PEEK film was bonded onto the liquid crystalline polymer layer of the optical element thus obtained, using a UV curing type acrylic adhesive. Thereafter, the PEEK film which had been used as an orientating substrate was peeled off slowly, allowing the liquid crystalline polymer layer to be transferred onto the PES film. This optical element had a Δn.d of 0.84 μm and the polymer inherent viscosity was little changed. Then, a silicone-based hard coating material was applied onto the liquid crystalline polymer surface of the optical element by a spray coating method, and after setting, the hard coating material was hardened by heat treatment at 120° C. for 60 minutes. After this heat treatment, the orientation of the liquid crystalline polymer layer was disturbed and the monodomain structure was not retained therein.

Comparative Example 5

There was prepared a 17 wt % solution of the polymer (inherent viscosity: 0.18) of the formula (1) in phenol/tetrachloroethane (60/40 weight ratio). This solution was applied, using a gravure roll coater, onto a 75 μm thick polyimide (PI) film having a size of 15 cm×23 cm and which had been subjected to a rubbing treatment directly, followed by drying at 180° C. for 30 minutes and subsequent cooling to fix a uniform nematic structure of monodomain. The liquid crystalline polymer layer of the optical element thus obtained was bonded onto a glass plate using an epoxy adhesive and then the PI film which had been used an orientating substrate was peeled off slowly, allowing the liquid crystalline polymer layer to be transferred onto the glass plate. This optical element had a Δn.d of 0.80 μm and the polymer inherent viscosity was little changed. Then, using a polyvinyl butyral sheet as an intermediate layer and also using another glass plate, the optical element was pressure-bonded under heating at 140° C. and 14 kgf/cm² for 20 minutes. The resultant glass laminate was opaque and the uniform nematic structure of monodomain was destroyed completely.

Comparative Example 6

There was prepared a 15 wt % solution of the polymer mixture (inherent viscosity of a base polymer: 0.18, that of an optically active polymer: 0.15) in phenol/tetrachloroethane (60/40 weight ratio). This solution was applied, using a roll coater, onto a 50 μm thick PEEK film having a size of 15 cm×2B cm and which had been subjected to a rubbing treatment directly, to form a coating, followed by drying, heat treatment at 180° C. for 30 minutes and subsequent cooling to fix a uniform twisted nematic structure of monodomain. The liquid crystalline polymer layer of the optical element thus obtained was bonded onto a polyarylate (PA) film using an epoxy adhesive and then the PEEK which had been used as an orientating substrate was peeled off slowly, allowing the liquid crystalline polymer layer to be transferred onto the PA film. This optical element had a twist angle of −225° and a Δn.d of 0.85 μm. The polymer inherent viscosity was little changed. Then, a silicone-based hard coating material was applied onto the liquid crystalline polymer surface of the optical element by a spray coating method, and after setting, the hard coating material was hardened by heat treatment at 120° C. for 60 minutes. After this heat treatment, the sample no longer had the uniform twisted nematic structure of monodomain.

As set forth hereinabove, since the process for producing a heat-resistant optical element using a liquid crystalline polymer according to the present invention can impart a high heat resistance to the optical element while maintaining the characteristics of the same element, the degree of freedom of the optical element expands in point of working environment, secondary processing and mounting to devices, and thus the process of the present invention is of an extremely high industrial value in the fields of optics and opto-electronics.

What is claimed is:

1. A process for producing a heat-resistant optical element comprising a light transmitting substrate, an alignment film formed on said substrate, and a layer of a heat-polymerizable liquid crystalline polymer which exhibits a nematic orientation or a twisted nematic orientation in the liquid crystal phase and which assumes a glassy state at a temperature below a liquid crystal transition point of the polymer, characterized in that said liquid crystalline polymer layer is heat-treated at a temperature high enough for the polymerization of the liquid crystalline polymer to proceed at at least one of the stages of during an orientating treatment and after fixing of the orientation obtained.

2. A process for producing a heat-resistant optical element, involving transferring a layer of a heat-polymerizable liquid crystalline polymer formed on an orientating substrate onto a light transmitting substrate, said liquid crystalline polymer exhibiting a nematic orientation or a twisted nematic orientation in the liquid crystal phase and assuming a glassy state at a temperature below a liquid crystal transition point of the polymer, characterized in that said liquid crystalline polymer layer is heat-treated at a temperature high enough for the polymerization of the liquid crystalline polymer to proceed at at least one of the stages of during an orientating treatment, after fixing of the orientation obtained and after the transfer.

3. The process of claim 1 or claim 2, wherein the liquid crystalline polymer is a main chain type liquid crystalline polymer having twisted nematic orientability.

4. The process of claim 1 or claim 2, wherein the liquid crystalline polymer is a main chain type liquid crystalline polymer having optical activity.

5. The process of claim 1 or claim 2, wherein the liquid crystalline polymer comprises a main chain type liquid crystalline polymer which is not optically active and an optically active compound.

6. The process of claim 1 or claim 2, wherein the liquid crystalline polymer is a polyester containing ortho-substituted aromatic units as a constituent.

7. The process of claim 1 or claim 2, wherein the heat treatment temperature is in the range of 100° to 350° C.

8. The process of claim 7, wherein the heat treatment temperature is in the range of 150° to 300° C.

9. The process of claim 1 or claim 2, wherein the heat treatment is performed for a period of time in the range of 10 seconds to 60 minutes.

* * * * *

UNITED STATES PATENT AND TRADEMARK OFFICE
CERTIFICATE OF CORRECTION

PATENT NO.   : 5,359,443
DATED        : October 25, 1994
INVENTOR(S)  : Takehiro Toyooka, et al.

It is certified that error appears in the above-indentified patent and that said Letters Patent is hereby corrected as shown below:

```
Column  2, line 10:  "no"    should read --to--
Column  4, line 66:  after "or" inset --(b)--
Column 20, line  7:  "350"   should read --350° C--
Column 21, line  2:  "300°"  should read --300° C--
Column 24, line 66:  "200"   should read --400--
Column 26, line 46:  "0.82"  should read --0.84--
Column 26, line 66:  "0.92"  should read --0.94--
Column 27, line 38:  "0.8"   should read --0.84--
Column 28, line 24:  "sheen" should read --sheet--
Column 29, line 53:  "2B"    should read --23--
```

Signed and Sealed this

Ninth Day of April, 1996

BRUCE LEHMAN

*Attest:*

*Attesting Officer*                    *Commissioner of Patents and Trademarks*